United States Patent [19]

Wagner et al.

[11] Patent Number: 5,509,166
[45] Date of Patent: Apr. 23, 1996

[54] WIPER BLADE FOR MOTOR VEHICLE WINDSHIELD WIPERS

[75] Inventors: Walter Wagner, Bühl, Germany; Hubert Verelst, Tienen; Dirk Nys, Tielt-Winge, both of Belgium

[73] Assignee: Robert Bosch GmbH, Stuttgart, Germany

[21] Appl. No.: 273,315

[22] Filed: Jul. 11, 1994

[30] Foreign Application Priority Data

Jul. 9, 1993 [DE] Germany .................. 9310261 U

[51] Int. Cl.⁶ .................. B60S 1/04; B60S 1/38
[52] U.S. Cl. .................. 15/250.44; 15/250.43; 15/250.201
[58] Field of Search .................. 15/250.42, 250.20, 15/250.36, 250.41, 250.34, 250.31, 250.35

[56] References Cited

U.S. PATENT DOCUMENTS

| | | | |
|---|---|---|---|
| 3,673,631 | 7/1972 | Yamadai et al. | 15/250.42 |
| 3,862,465 | 1/1975 | Ito | 15/250.42 |
| 4,309,790 | 1/1982 | Bauer et al. | 15/250.42 |
| 4,741,071 | 5/1988 | Bauer et al. | 15/250.42 |
| 4,766,636 | 8/1988 | Shinpo | 15/250.42 |
| 5,311,636 | 5/1994 | Lee | 15/250.2 |

FOREIGN PATENT DOCUMENTS

| | | | |
|---|---|---|---|
| 3532535 | 3/1987 | Germany | 15/250.42 |
| 3532536 | 5/1987 | Germany . | |
| 1572869 | 6/1990 | U.S.S.R. | 15/250.42 |

*Primary Examiner*—Gary K. Graham
*Attorney, Agent, or Firm*—Michael J. Striker

[57] ABSTRACT

A wiper blade for motor vehicle windshields, comprises a support having an elongated U-shaped main bracket with two spaced ends, and further brackets pivotally connected with the ends and each having a claw pair at their end, an elongated, rubber elastic wiper strip adapted to abut against a windshield and having longitudinal sides engaged by the claw pairs, a spoiler adapted to extend toward the windshield and arranged on a side of the main bracket toward which traveling wind flows predominantly, the main bracket has two legs and a base wall connecting the legs with one another and provided with throughgoing openings, the throughgoing openings extending in one of the legs of the main bracket which faces away from the spoiler.

1 Claim, 2 Drawing Sheets

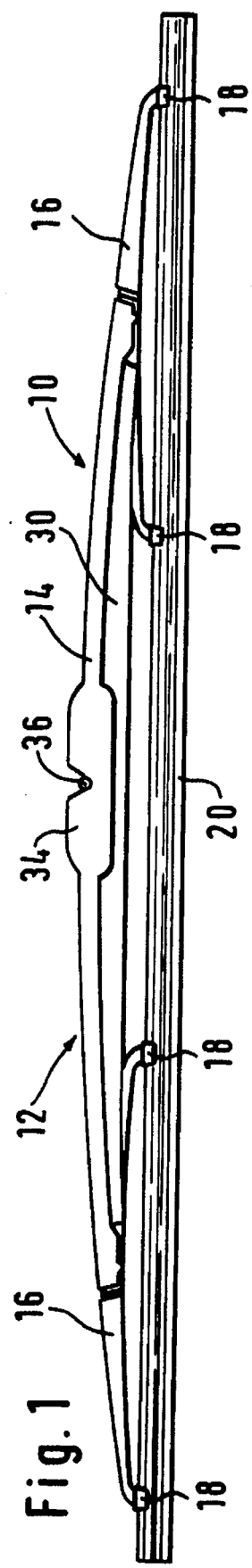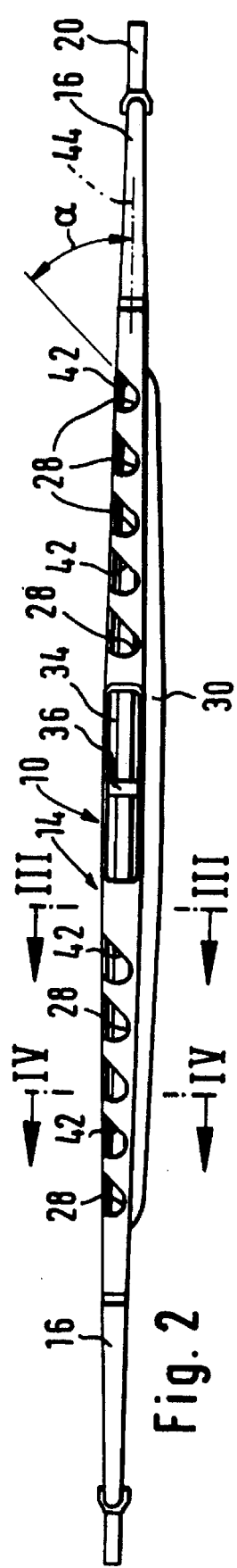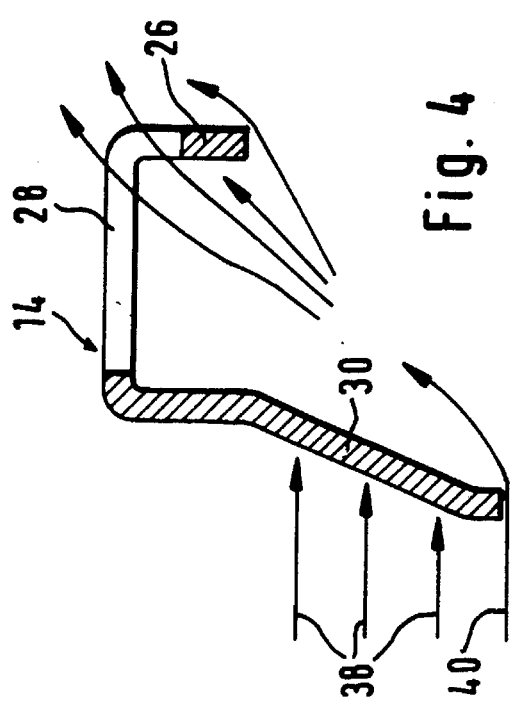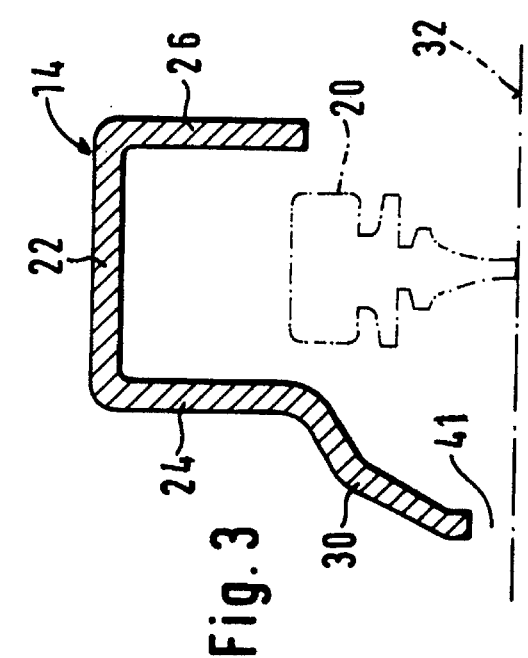

WIPER BLADE FOR MOTOR VEHICLE WINDSHIELD WIPERS

BACKGROUND OF THE INVENTION

The present invention relates to a wiper blade for motor vehicle windshield wipers.

More particularly, it relates to a wiper blade with an elongated U-shaped main bracket having further brackets articulately connected with its ends and having claw pairs arranged on their ends for engaging the longitudinal sides of a longitudinal, rubber-elastic wiper strip adapted to abut against a windshield.

Wipe blades of the above mentioned general type are known. One such wiper blade is disclosed, for example, in the German patent DE-PS 35 32 536. In this wiper blade passages arranged in a base wall of the main bracket are at most so wide that they allow a distance between both U-legs. Thereby the full width of the U-leg opposite to the spoiler, which has a predetermined height for strength reasons, is located in an air stream. This leads to undesired whirling of the air stream and thereby to a worsening of the wiping quality at high traveling speeds.

SUMMARY OF THE INVENTION

Accordingly, it is an object of the present invention to provide a wiper blade of the above mentioned general type, which avoids the disadvantages of the prior art.

In keeping with these objects and with others which will become apparent hereinafter, one feature of the present invention resides, briefly stated, in a wiper blade of the above mentioned type, in which the throughgoing openings extend to the U-leg of the main bracket facing away from the spoiler.

When the wiping blade is designed in accordance with the present invention, the rear leg located in the air stream in the region of the throughgoing openings can be substantially smaller so that the whirling is substantially reduced. Simultaneously, the throughgoing openings come closer in direction of the incoming air flow, so that it can be released lighter and faster through the throughgoing openings of the main bracket and the negative pressure is greater under the main bracket. Further, due to these features the surfaces of the spoiler can be reduced. The inventive strength of the main bracket is guaranteed by the other U-leg and the spoiler arranged on it.

In accordance with another feature of the present invention, the throughgoing openings have at least one side edge which encloses an acute angle with a longitudinal axis of the main bracket. The side edge can extend substantially horizontally when the wiper blade covers the half of its swinging angle on the windshield which amounts substantially to between 90° and 100°.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a wiper blade of a windshield wiper in accordance with the present invention;

FIG. 2 is a plan view of the wiper blade of FIG. 1;

FIG. 3 is a view showing a section surface of a wiper blade-main bracket on an enlarged scale, with identified position of a wiper strip, taken in the section along the line III—III in FIG. 2, when the wiper blade abuts against a substantially curved windshield;

FIG. 4 is a section of the wiper blade main bracket along the line IV—IV in FIG. 2 on an enlarged scale and FIG. 5 is a view showing the inventive windshield wiper on a windshield of a vehicle.

DESCRIPTION OF THE PREFERRED EMBODIMENTS

Figure 5:
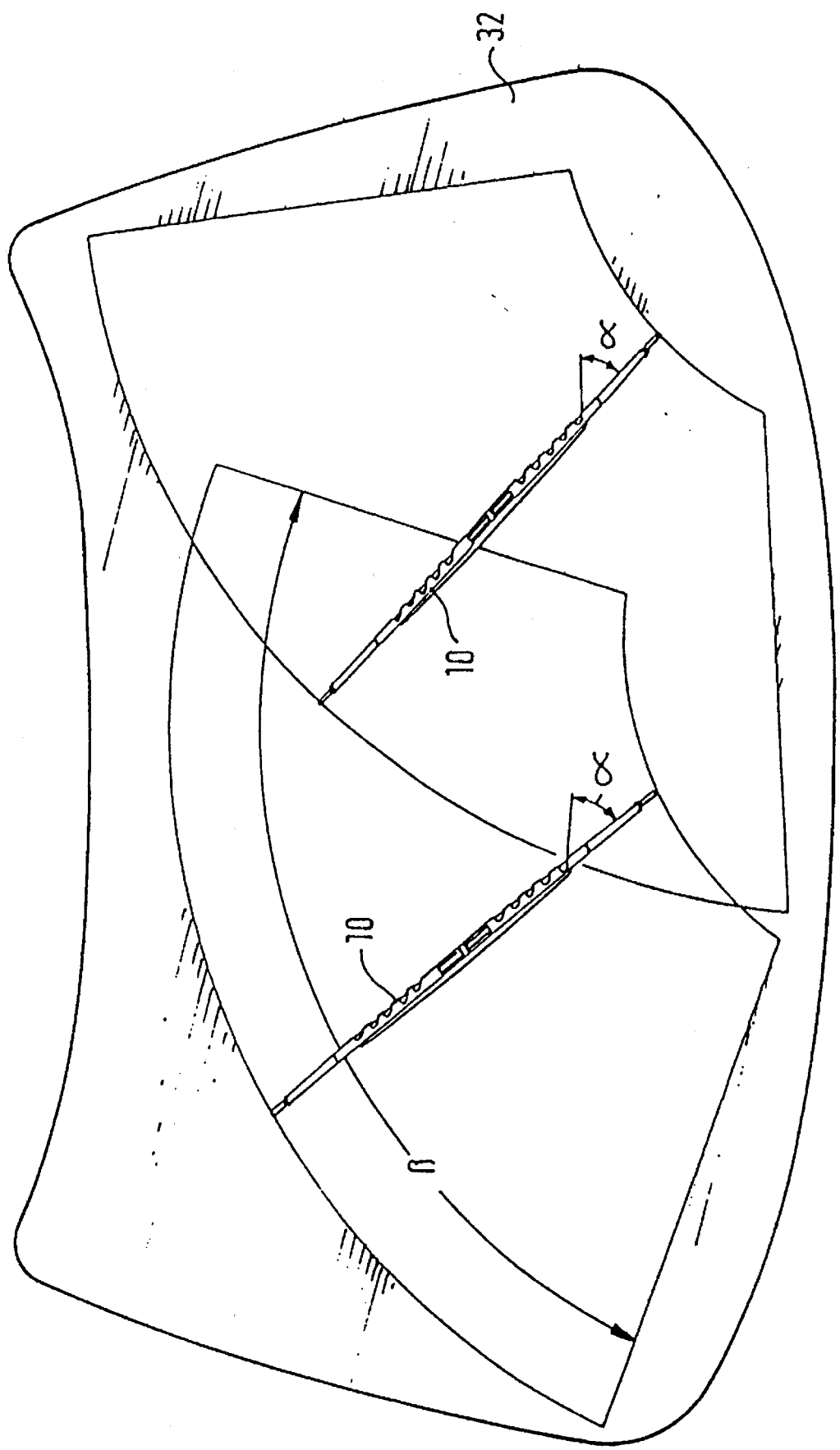

A wiper blade 10 shown in FIG. 1 has a multi-part supporting frame 12 which includes a main bracket 14 and further scale balance-like lower or claw brackets 16 arranged on its ends. An elongated wiper strip 20 is located vertically under the caw bracket 15 and engaged by claw pairs 18 arranged at the ends of the claw brackets. The claw pairs engage with the rears of the wiper strip 20 and extend into longitudinal grooves provided opposite to one another in a rear region of the wiper strip.

The main bracket 14 is elongated and has a U-shaped cross-section as can be seen from FIGS. 3 and 4. It includes base wall 22 which connects two legs 24 and 26 arranged at a distance from one another. As can be seen from the plan view of FIG. 2 the main bracket 14 has throughgoing openings 28 located mainly in the base wall 22 and extending only to the region of the leg 24. This is seen especially clearly from FIG. 4. The other leg 24 which is opposite to the leg 26 is provided with a spoiler 30 extending close to the windshield 32 to be wiped in FIG. 3. Moreover, FIG. 3 shows with dash-dot lines the position of the wiper strip 20 in which it is located when the wiper blade 10 wipes a substantially curved region of the windshield. Further, the main bracket 14 in its central region is provided with a so-called suspension box 34 for arranging a suspension axle 36 which connects the wiper blade with a not shown, driven wiper arm.

During the operation of the wiper blade 9 traveling wind flows forcedly at the side of the wiper blade provided with the spoiler 30 as identified with the arrow 38 in FIG. 2. A part of the traveling wind (arrow 40) flows however through a gap 41 (FIG. 3) produced between the free spoiler end and the surface of the windshield 32 to be wiped, behind the spoiler 30. This partial stream flows especially at the main bracket 14 from downwardly and tends to lift the wiper blade 14 from the windshield this partial stream 40. It is worth to provide the least gripping surface for this partial stream 40 and withdraw it from the wiper blade region as fast as possible. This is achieved in advantageous manner, in that the throughgoing openings 28 extend in the leg 26 of the main bracket 14 facing away from the spoiler 30.

As can be seen from the plan view of FIG. 2, the throughgoing openings 28 have a side edge 42 which forms an acute angle α with a central longitudinal plane 44 of the main bracket 14. The inclined direction of the side edge 42 is selected so that it extends substantially horizontally when the wiper blade 10 covers the half of its swinging angle on the windshield 32 corresponding to substantially between 90° and 100° as shown in FIG. 5, since in this position the wiper blade is subjected to the most direct flow of the traveling wind stream deviated on the windshield to the side. It is guided through the thusly arranged throughgoing openings 28 through the main bracket 4 without any disturbances.

It will be understood that each of the elements described above, or two or more together, may also find a useful application in other types of constructions differing from the types described above.

While the invention has been illustrated and described as embodied in a wiper blade for motor vehicle windshield wipers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A wiper blade for wiping a windshield of a motor vehicle, said wiper blade comprising a support having an elongated U-shaped main bracket with opposite end portions defining opposite ends, an elongated lower bracket pivotally connected with each end of said main bracket, said lower brackets having opposite ends with claw pairs thereon, said main bracket and lower brackets having a central longitudinal plane passing therethrough; an elongated rubber elastic wiper strip adapted to abut against a windshield, said wiper strip having longitudinal sides engaged by said claw pairs and held thereby, said main bracket having substantially parallel first and second legs and a flat base wall connecting said legs with one another, said base wall being perpendicular to said plane; a spoiler extending from said first leg at an angle thereto, said main bracket being provided with a plurality of throughgoing openings in each end portion, each opening lying partly in said base wall and partly in said second leg, each of said throughgoing openings having at least one side edge in said base wall which forms an acute angle with the central longitudinal plane of said main bracket, said side edges of said openings being substantially parallel with one another.

* * * * *